Jan. 2, 1962     F. M. VAN CAMPEN     3,015,757
FRAME CONSTRUCTION FOR A METER MOTOR

Filed April 7, 1958     3 Sheets-Sheet 1

INVENTOR.
FRANK M. VAN CAMPEN
BY Woodhams, Blanchard and Flynn
ATTORNEYS

INVENTOR.
FRANK M. VAN CAMPEN

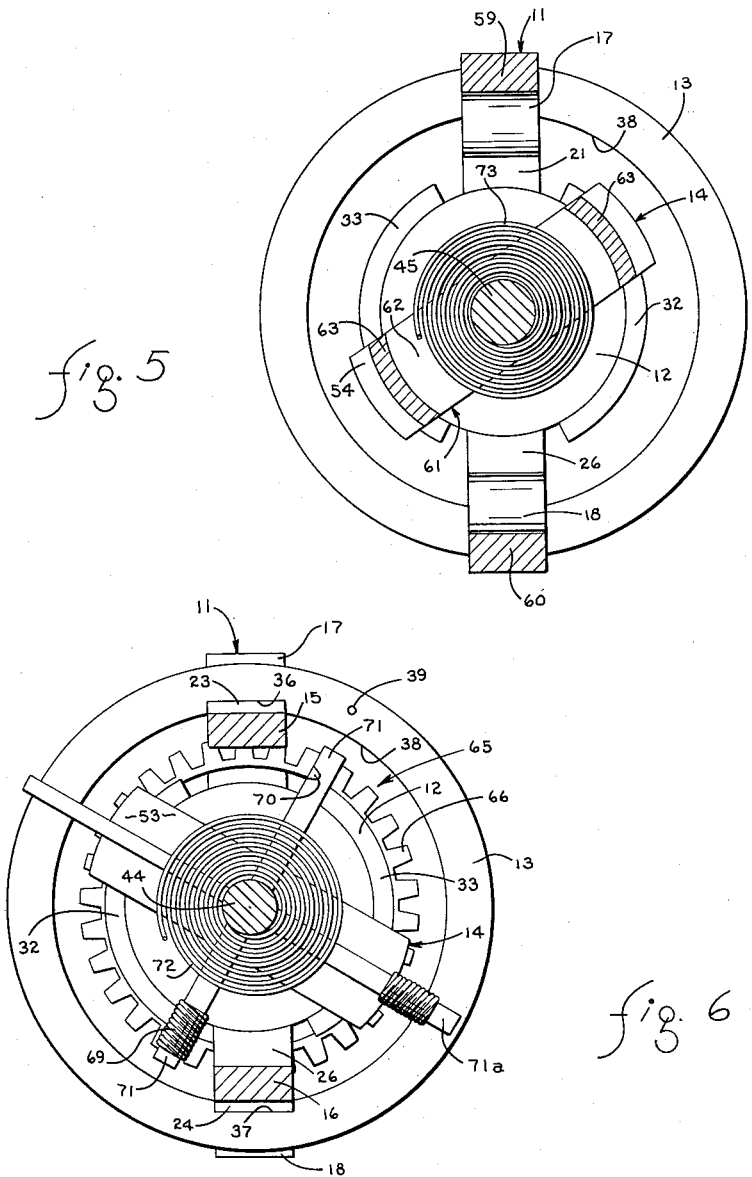

United States Patent Office 3,015,757
Patented Jan. 2, 1962

3,015,757
FRAME CONSTRUCTION FOR A METER MOTOR
Frank M. Van Campen, Kalamazoo, Mich., assignor to Allen Electric and Equipment Company, Kalamazoo, Mich., a corporation of Michigan
Filed Apr. 7, 1958, Ser. No. 726,661
5 Claims. (Cl. 317—166)

This invention relates in general to a meter motor and, more particularly, to a type thereof having a D'Arsonval type of movement and an improved frame structure therefor.

The D'Arsonval type of meter motor has been, and still is, widely used for a variety of purposes including the detection of relatively small amounts of electrical energy and conversion thereof into mechanical movement. However, particularly where the motor unit is relatively small, difficulty has been encountered in the past in providing an inexpensive, easily assembled and accurately constructed frame structure for said D'Arsonval motors whereby little or no calibration or adjustment is required to place the assembled motor in condition for reliable operation.

In the past, it has been common practice in the manufacture of relatively small D'Arsonval motor movements to mount both the core and the current conducting, movable coil upon end brackets which are secured to the flux carrying stator ring by studs which extend through openings in the stator ring parallel with the axis thereof. In order to reduce the cost of manufacturing, these end brackets are usually stamped and their stud receiving openings are usually somewhat larger than said studs in order to allow for manufacturing variations. As a result, the magnetic core and the current conducting coil are often slightly eccentric with respect to each other or the flux conducting stator ring. Furthermore, the discontinuity created in the stator ring as a result of the stud openings and the studs received therethrough produces zones of non-uniform flux distribution. These zones adversely affect the accuracy of the meter motor and may, in some instances, prevent an accurate calibration of the instrument, unless costly compensations are made for the non-uniform zones.

It is well-known that stamping procedures do not provide accurate dimensions, particularly after the dies have been used for some time. Accordingly, where stamped end brackets are used for supporting the current conducting coil and magnetic core, it is often impossible to get accurate axial alignment of the bearing elements at the opposite axial ends of the pivotally supported current conducting coil. This not only results in radial variations between the coil and the flux conducting stator ring or the magnetic core, but also often creates variations in the frictional losses from one motor unit to the next and renders such variations substantially unpredictable. Although these variations may be relatively small in themselves, they cannot be neglected in view of the size and type of instrument involved.

Because of the structural inaccuracy in existing frames for D'Arsonval type meter motors, as set forth above, the assembled unit must be calibrated and adjusted before it is combined with the device, such as an indicator and a dial or mechanical linkage, with which it is used. This not only adds to the cost of providing the completed unit, but also makes it impossible to index the motor assembly for quick and easy installation. That is, because of variations between individual units, said existing motors are not adaptable to routine and non-technical installation procedures.

Accordingly, a primary object of this invention is the provision of a meter motor having a D'Arsonval type of movement which is adaptable to production methods of fabrication and assembly, which can be made easily and accurately and which can be assembled more quickly and easily than existing structures for the same or similar purposes.

A further object of this invention is the provision of a meter motor, as aforesaid, having a one piece frame structure into and upon which the other parts of the motor can be easily and accurately assembled to provide a meter motor requiring no adjustment after assembly, insofar as the frame structure is concerned, and which, therefore, permits combination of the motor with cooperating mechanisms in a substantially routine and predeterminable manner without positional adjustments or technical compensations.

A further object of this invention is the provision of a motor frame structure, as aforesaid, which can support a stator ring so that it provides a substantially uninterrupted and uniform flux distribution around the magnetic core, and which maintains a substantially constant radial spacing or air gap between said stator ring and said magnetic core, whereby the rotational movement of the current conducting coil supported within said frame structure is accurately proportional to the electrical potential conducted to said coil.

A further object of this invention is the provision of a motor frame structure, as aforesaid, which can be produced by conventional metal working and machining operations at a cost competitive with less effective and less accurate devices designed for the same or similar purposes.

Other objects of this invention will become apparent to persons familiar with this type of equipment upon reading the following specification and examining the accompanying drawings in which:

FIGURE 5 is a sectional view taken along the line V—V of FIGURE 3.

FIGURE 6 is a sectional view taken along the line VI—VI of FIGURE 3.

Figure 2:
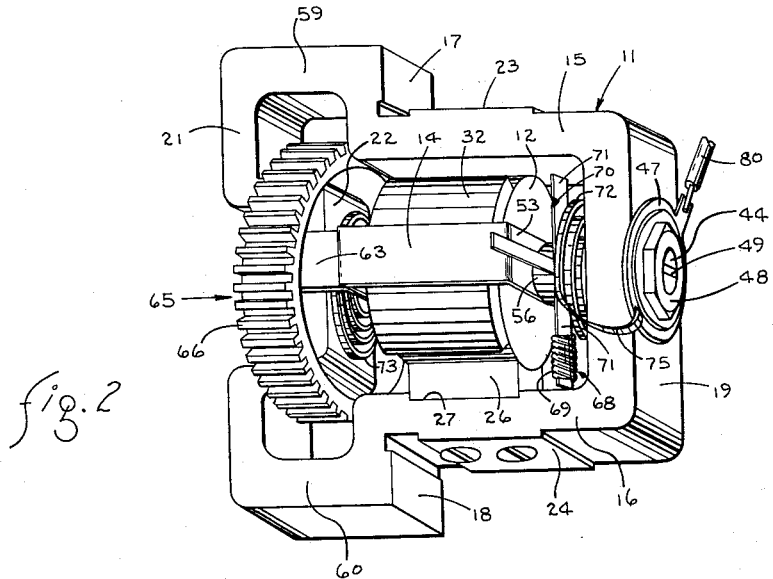
FIGURE 2 is a perspective view of the meter motor of FIGURE 1 with the stator ring removed therefrom.

For the purposes of convenience in description, the terms "inner," "outer," and derivatives thereof will have reference to the geometric center of said meter motor and parts thereof. The terms "upper," "lower," and derivatives thereof will have reference to said meter motor as appearing in FIGURES 1, 2 and 3. The terms "left," "right," and derivatives thereof will have reference to the left and right ends, respectively, of the meter motor and parts thereof as appearing in FIGURES 2 and 3.

*General description*

In order to meet the objects of the invention, including those set forth above, there has been provided a frame structure for a meter motor having a D'Arsonval type movement including a stator ring, a concentric magnetic core and a current-conducting coil encircling said core and movable with respect thereto. The coil is pivotally supported upon, and within, a one-piece frame member which rigidly supports said magnetic core and is rigidly secured within the flux-distributing stator ring of the motor. In this particular embodiment, the current-conducting coil is secured to a ring gear for the purpose of effecting a mechanical operation. Resilient means are provided for resisting rotative movement of the current-conducting coil about its pivotal axis in a predeterminable and preselectable amount.

Detailed construction

Figure 1:
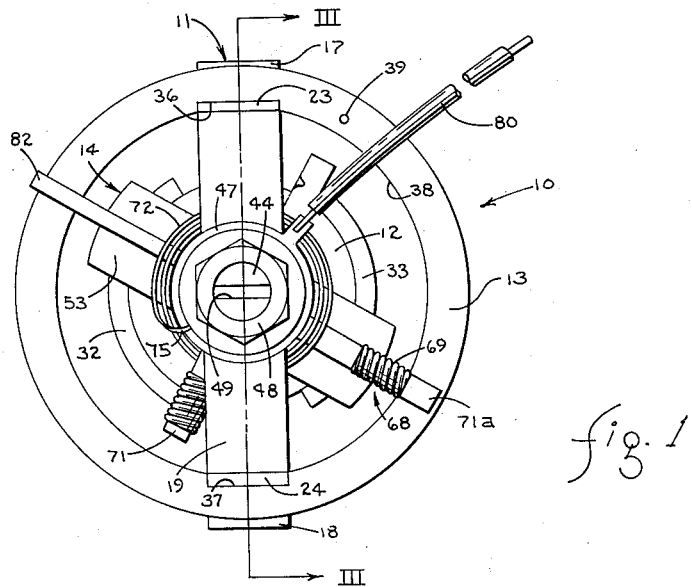
FIGURE 1 is an end elevational view of a meter motor having a frame structure embodying the invention.
Figure 3:
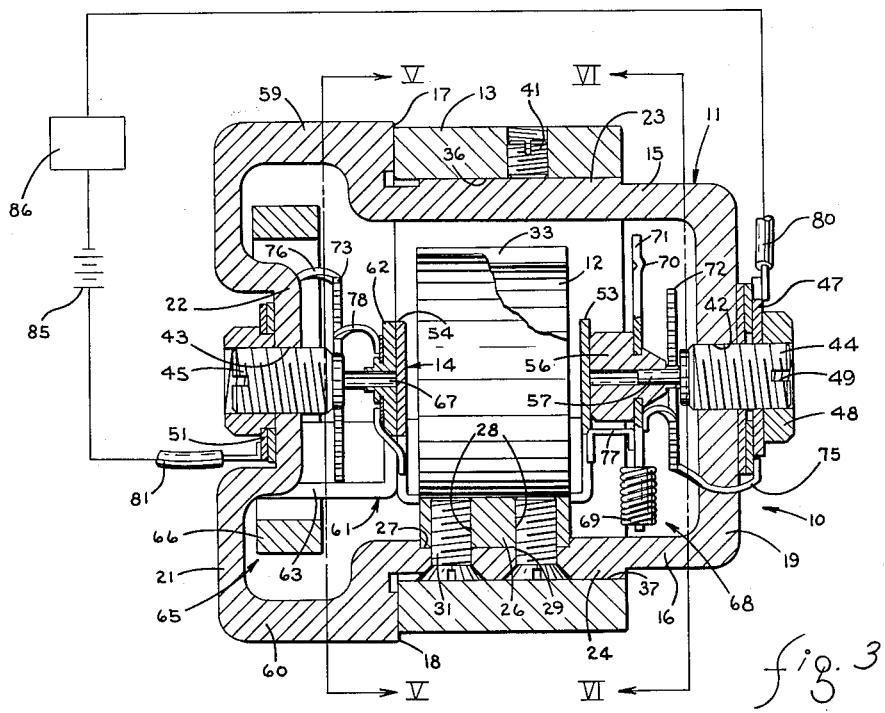
FIGURE 3 is a sectional view substantially as taken along the line III—III of FIGURE 1.
Figure 4:
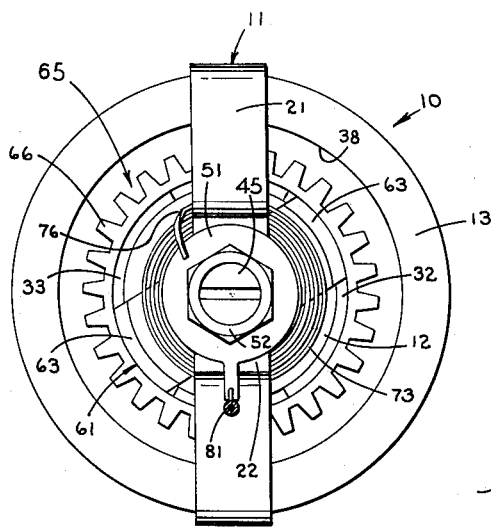
FIGURE 4 is an end elevational view of said meter motor as viewed from the opposite end shown in FIGURE 1.

The meter motor 10 (FIGURES 1 and 3), which illustrates one embodiment of the invention, is comprised of a substantially rectangular frame member 11 in which a magnetic core 12 is rigidly secured and which is encircled by a stator ring 13, which is concentric with the magnetic core 12. A current-conductive coil is pivotally supported upon and within said frame so that it encircles said magnetic core. The frame member 11 (FIGURES 2 and 3) has a pair of substantially parallel side elements 15 and 16, which are offset outwardly near their leftward ends, thereby providing the external shoulders 17 and 18, which are carefully machined on their rightward faces. The ends of said elements 15 and 16 are integral with, and preferably substantially perpendicular to, the opposite ends of the right and left end elements 19 and 21, respectively. The left end element 21 has a central inwardly offset portion 22 for reasons appearing hereinafter. The various frame elements of the frame member 11 are preferably contiguous with and lie substantially between a pair of spaced parallel planes, as shown in FIGURES 1 and 4. The side elements 15 and 16 have, between their respective shoulders 17 and 18 and their rightward ends, outwardly projecting bosses 23 and 24 which are carefully and accurately machined on their outer surfaces for reasons appearing hereinafter.

The magnetic core 12 (FIGURE 3) is circular in cross section and is secured to the pedestal 26. The lower side element 16 has a machined recess 27 in its inner surface into which said pedestal 26 is snugly received so that said core 12 can be accurately and easily positioned with respect to the frame member 11. The pedestal 26 has a pair of tapped openings 28 which are aligned with bored openings 29 through the side element 16. Screws 31 are slidably received through the openings 29 and threadedly engaged with the openings 28 for rigidly holding the magnetic core 12 with respect to the side element 16, hence with respect to the frame member 11. A pair of arcuate pole shoes 32 and 33 are mounted upon the diametrically opposite sides of the permanent magnetic core 12, and substantially midway between the upper and lower surfaces thereof, for the purpose of increasing the flux field substantially uniformly in a well-known manner.

The stator ring 13 (FIGURES 1 and 6) is preferably cylindrical and has an inside diameter slightly smaller than the distance between the remote outside surfaces of the bosses 23 and 24 on the frame member 11. A pair of grooves 36 and 37 are accurately machined in the diametrically opposite sides of the inner surface 38 of said ring 13 so that they extend parallel with the axis of said ring. The bosses 23 and 24 on the frame member 11 are snugly but slidably received into the grooves 36 and 37, respectively, for positioning and securing the frame member 11 circumferentially of the stator ring 13. Accordingly, a stop member 39 (FIGURE 1) secured to, and extending from, the right end of ring 13 will always be in precisely the same position with respect to both its frame member 11 and its magnetic core 12. The rightward faces of the shoulders 17 and 18 (FIGURE 2) engage, and accurately position, the stator ring 13 axially with respect to the frame member 11. The stator ring 13 is held against axial movement away from said shoulders 17 and 18 by a setscrew 41 (FIGURE 3).

As a result of the control which can be exercised during the machining operations producing the grooves 36 and 37, the outer surfaces of the bosses 23 and 24, and the recess 27 in the side element 16, it is possible to position the stator ring substantially exactly concentric with the magnetic core 12, thereby providing a uniform air gap as a direct result of normal assembly operations and without further adjustment. The relatively small set screw 41 and the shallow grooves 37 and 38 have a negligible effect upon the uniform distribution of the flux in said stator ring. Furthermore, the entire assembly including the stator ring 13, the magnetic core 12, and the frame member 11 become a single, rigid structure having no parts capable of moving out of alignment with each other, accidentally or otherwise.

The end elements 19 and 21 (FIGURE 3) of the frame member 11 have coaxial tapped openings 42 and 43, respectively, which are disposed approximately midway between the side elements of said frame member and into which the externally threaded bearing posts 44 and 45 are threadedly received. The bearing posts 44 and 45 may be provided with pivot jewels at their inner opposing ends in a substantially conventional manner. A portion of the right bearing post 44 extends rightwardly beyond the end element 19 where it is encircled by a conductive washer 47 which is electrically insulated both from the frame member 11 and the bearing post 44. The washer 47 and the bearing post 44 are held against movement with respect to the frame member 11 by means of a lock nut 48. Said bearing post 44 has a tool receiving opening 49 in its outer end for adjusting its axial position with respect to the frame member 11. The left bearing post 45, which may be substantially identical with the bearing post 44, is encircled by a conductive washer 51 electrically insulated from said frame and held against axial movement with respect to the frame member 11 by a lock nut 52.

The magnetic core 12 is encircled by the conductive coil 14, which is preferably fabricated in a substantially conventional manner from a plurality of substantially concentric and adjacent windings of an insulated, conductive material, such as copper wire. The conductive coil 14 is substantially rectangular in shape and has a pair of substantially parallel side portions 53 and 54 disposed adjacent to the right and left axial ends, respectively, of the magnetic core 12. Said conductive coil is spaced from, and is movable about the axis of, the magnetic core 12. A spindle hub 56 is secured to the external surface of the side portion 53 on the conductive coil 14 midway between the ends thereof and supports a pivot spindle 57 which is coaxial with the magnetic core 12 and the stator ring 13 when the conductive coil 14 is uniformly spaced from the magnetic core 12. The pivot spindle 57 is pivotally engageable with the inner end of the bearing post 44.

A U-shaped gear supporting bracket 61 (FIGURE 3) has its bight 62 secured to and, parallel with, the side portion 54 of the conductive coil 14 and its arms 63 extend toward the end frame element 21. An externally toothed ring gear 66 is secured upon the arms 63 of said gear bracket 61 so that it encircles the offset portion 22 of the end element 21 coaxially with the bearing post 45. Said gear 66 also extends into the recesses created by the offset portions 59 and 60 in the side elements 15 and 16, respectively. A pivot spindle 67 is secured to, and extends outwardly from, the bight 62 so that it is coaxial with the pivot spindle 57 on the hub 56.

The pivot assembly 65, including the conductive coil 14, the pivot spindles 57 and 67 and the ring gear 66, is statically balanced by means of a balance device 68 (FIGURES 1 and 3), which is supported upon the spindle hub 56. Said device 68 includes a plurality of arms 71 secured to, and extending radially from, the hub 56 at circumferentially spaced intervals therearound. Balance weights 69, which may be pre-formed, non-ferrous coils, are suitably cut and mounted upon said arms 71. Each arm 71 has a sidewardly extending projection 70 (FIGURES 2 and 3) which is engageable with said coil or weight 69 and whereby rotation of said coil effects movement thereof toward and away from said hub. A pair of coil springs 72 and 73 encircle the pivot spindles 57 and 67, and their outer ends are connected electrically to the conductive washers 47 and 51, respectively, by means of the conductors 75 and 76. The inner ends of the springs 72 and 73 are connected to, and supported upon, the conductive coil 14 by means including the conductors 77 and 78, respectively. The springs 72 and 73 are supported substantially coaxial with the coil 14 by means of the relatively stiff conductors 75, 76, 77 and 78. Accordingly, the springs 72 and 73 not only act as conductors to and from the conductive coil 14, but also serve to resist rotative movement of the coil 14 about the axis of the magnetic core 12. Current is conducted toward or away from the conductive washers 47 and 51 by means of the conductors 80 and 81, respectively.

As shown in FIGURE 1, the weight arm 71a is extended somewhat for engagement with the stop member 39 to provide a zero position for the conductive coil 14 and any means connected thereto, such as the ring gear 66 or the indicator arm 82.

*Assembly and operation*

The pivot assembly 65 (FIGURES 2 and 3), which comprises the conductive coil 14, the ring gear 66, the springs 72 and 73, and other associated parts, is statically balanced by means of the balance device 68 prior to assembly with the entire meter motor 10. It will be recognized that the ring gear 66 and bracket 61 mounted upon the conductive coil 14 are only illustrative of many types of linkage, or the like, whereby the movement of the conductive coil 14 may be used to effect some desired operation. Similarly, the indicator arm 82 (FIGURE 1) is only illustrative of many devices whereby the movement of the conductive coil 14 may be observed, recorded or otherwise monitored.

The bearing posts 44 and 45 are mounted in the frame member 11 so that they are spaced from each other a distance slightly greater than the distance between the remote tips of the pivot spindles 57 and 67. The pivot assembly 65 is then placed into position between the bearing posts 44 and 45 after which the magnetic core 12 and its attached shoes 32 and 33 and the pedestal 28 are positioned within the conductive coil 14 so that the pedestal 28 is disposed in the recess 27. The core 12 is then properly fixed into position by means of the screws 31 after which the bearing posts 44 and 45 are adjusted so that the coil unit 65 is properly pivoted therebetween. The conductive washers 47 and 51 and their respective conductors 80 and 81 are positioned on the bearing posts 44 and 45 and loosely held there by the lock nuts 48 and 52. The frame member 11 is now mounted within the stator ring 13 and fixed against axial movement by the set screw 41. The springs 72 and 73 are now moved circumferentially around their respective pivot posts until the conductive coil 14 is in the desired position and the springs 72 and 73 are under the proper tension, after which the lock nuts 48 and 52 are tightened.

The conductors 80 and 81 are connected in series with a suitable source 85 (FIGURE 3) of D.C. potential, and a device 86 capable of using, or changing, such potential, the measurement of which it is the purpose of the meter motor 10 to detect. That is, the meter motor 10 is now ready to detect variations in direct current flow through the conductive coil 14 caused by the device 86.

Thus, it will be seen that the meter motor 10 has a simple and precise construction which can be assembled from a minimum of separate parts, thereby reducing to a minimum the variations between successive motors, as well as inaccuracies in any particular motor. Because of the carefully machined surfaces and the substantially rigid frame member 11, the positions and fitting of the various interengaging elements of the meter motor 10 can be accurately predetermined. Thus, these elements can be assembled by production procedures and the need for adjustment in the final assembly can be maintained at a minimum.

It will be recognized that the basic structure disclosed herein is capable of many uses and may be modified as by replacing the ring gear 66 with other types of mechanical linkage for effecting a variety of operational functions. Thus, although a particular preferred embodiment of the invention has been disclosed herein for illustrative purposes, it will be understood that variations or modifications of such disclosure, which lie within the scope of the appended claims, are fully contemplated.

What is claimed is:

1. A meter motor comprising: a magnetic core having a substantially circular cross section; an integral substantially rectangular frame member having a pair of spaced side walls and a pair of spaced, integral end walls; interfitting means extending through said frame into said core rigidly securing said core to said frame member between said side walls and between and spaced from said end walls, the axis of said core extending through said end walls; a conductive coil within said frame and axially encircling said core, said coil being spaced from, and rotatable with respect to, said core; means pivotally supporting said coil upon said end walls for rotation about the axis of said core; resilient means secured to said frame member and connected to said coil for resisting rotation of said coil about said axis of said core; a stator ring sleeved over said side walls and surrounding the periphery of said core; and positively engaging means securing said frame member to said ring, said ring being coaxial with said core and with said coil, said frame having stop surfaces thereon engaging said stator ring and said core for maintaining predetermined axial alignment therebetween.

2. The structure of claim 1 wherein said positively engaging means for securing said frame member with respect to said ring includes a pair of diametrically disposed grooves in the inner wall of said ring, said grooves being parallel with the axis of said ring and arranged for slidably telescoping over the external surface of the side walls of said frame member, and said stop surfaces including a pair of shoulders in said side walls engageable with one axial end of said ring for fixing the axial position of same.

3. The structure of claim 1 wherein said side walls are offset radially outwardly at one end thereof; a ring gear supported upon, and movable with, said coil, said gear being coaxial with said coil located within said frame between the offset portions of said side walls and extending beyond the edges of the side walls thereof; and wherein the stator ring has means for effecting circumferential positioning thereof with respect to said frame, said offset portions in said side walls being engaged by one axial end of said stator ring.

4. A meter motor comprising: an integral, substantially rectangular frame having a pair of parallel side walls and a pair of parallel end walls; a cylindrical, magnetic core and screw means extending through said frame into said core fixedly securing said magnetic core within said frame between said end walls with the axis thereof parallel with said side walls; a rectangular, conductive coil within said frame and axially encircling said core and being rotatable through an arc of less than 180° extent with respect to said core; a shaft mounted on said coil at each end thereof coaxial with said core; a bearing mounted in each of said end walls coaxial with said core, said shafts being received in said bearings whereby said coil is supported coaxially with said core and is rotatable about said axis with respect to said core; a pair of coil springs located, respectively, at opposite ends of said coil and connected at one end thereof to said frame and connected at the other end thereof to said coil for resisting rotation of said coil about said axis; a stator ring externally sleeved over the sidewalls of said frame and positively engaging means fixedly securing said stator ring to said frame so that it surrounds the periphery of said core and is coaxial therewith.

5. A meter motor according to claim 4 wherein said side walls of said frame have aligned, radially outwardly extending shoulders against which one axial end of said stator ring abuts whereby the axial location of said stator ring with respect to said core is fixed; a ring gear secured to one axial end of said coil and located within said frame adjacent one end wall thereof; a balancing device including adjustable weights secured to the other axial end of said core and located within said frame adjacent the other end wall thereof whereby the coil and the parts connected thereto may be statically balanced.

References Cited in the file of this patent

UNITED STATES PATENTS

| | | |
|---|---|---|
| 1,927,346 | Lawrence | Sept. 19, 1933 |
| 2,408,060 | Grace et al. | Sept. 24, 1946 |
| 2,840,767 | Ammon | June 24, 1958 |

FOREIGN PATENTS

| | | |
|---|---|---|
| 162,546 | Austria | Mar. 10, 1949 |